United States Patent
McCumber et al.

(10) Patent No.: US 11,891,183 B2
(45) Date of Patent: *Feb. 6, 2024

(54) AUTOMATIC EJECTION SEAT PERFORMANCE AND ACCOMODATION OPTIMIZATION BASED ON ACTIVE INPUT OF AIRCREW DATA

(71) Applicant: AMI Industries, Inc., Colorado Springs, CO (US)

(72) Inventors: Ronald John McCumber, Colorado Springs, CO (US); Casey Andrew Stribrny, Colorado Springs, CO (US); Nicholas K. Bharucha, Colorado Springs, CO (US); John Hampton, Colorado Springs, CO (US); Kassidy L. Carson, Colorado Springs, CO (US); Bradley Mastrolia, Colorado Springs, CO (US); Steve Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 735 days.

This patent is subject to a terminal disclaimer.

(21) Appl. No.: 17/036,301

(22) Filed: Sep. 29, 2020

(65) Prior Publication Data

US 2022/0097859 A1    Mar. 31, 2022

(51) Int. Cl.
*B64D 25/10*     (2006.01)
*H04W 4/80*     (2018.01)
(Continued)

(52) U.S. Cl.
CPC ......... *B64D 25/10* (2013.01); *G06F 16/2457* (2019.01); *G06F 21/32* (2013.01); *H04W 4/80* (2018.02)

(58) Field of Classification Search
CPC ..................................................... B64D 25/10
See application file for complete search history.

(56) References Cited

U.S. PATENT DOCUMENTS 3,706,434 A    12/1972  Martin
4,673,147 A *   6/1987  Solomonides ......... B64D 25/10
                                              244/122 A
(Continued)

FOREIGN PATENT DOCUMENTS

CN    107804468    3/2019
CN    109573051    4/2019
(Continued)

OTHER PUBLICATIONS

European Patent Office; European Search Report dated Feb. 23, 2022 in Application No. 21198208.7.
(Continued)

*Primary Examiner* — Timothy D Collins
*Assistant Examiner* — Justin Michael Heston
(74) *Attorney, Agent, or Firm* — SNELL & WILMER L.L.P.

(57) ABSTRACT

A system for automatic optimization of an ejection system for an aircraft includes the ejection system having a plurality of adjustable settings. The system further includes an input device configured to receive user input. The system further includes a controller coupled to the ejection system and to the input device and configured to adjust at least one of the plurality of adjustable settings of the ejection system based on the user input.

17 Claims, 6 Drawing Sheets

(51) Int. Cl.
*G06F 16/2457* (2019.01)
*G06F 21/32* (2013.01)

(56) References Cited

U.S. PATENT DOCUMENTS

| | | | |
|---|---|---|---|
| 4,846,421 A | 7/1989 | Trikha | |
| 5,558,301 A | 9/1996 | Kerdoncuff et al. | |
| 6,254,126 B1 | 7/2001 | Bauer et al. | |
| 7,116,803 B2 | 10/2006 | Lemelson et al. | |
| 8,276,845 B2 | 10/2012 | Orgerie et al. | |
| 8,594,868 B2 | 11/2013 | Kell | |
| 9,523,985 B1 | 12/2016 | Barnes | |
| 9,707,913 B1 | 7/2017 | Ochai et al. | |
| 10,410,075 B2 | 9/2019 | Zebley et al. | |
| 10,543,798 B2 | 1/2020 | Desjardins et al. | |
| 10,546,274 B2 | 1/2020 | Jobling et al. | |
| 11,300,078 B2 | 4/2022 | Benjamin | |
| 11,505,325 B2 * | 11/2022 | McCumber | B64C 19/00 |
| 11,518,527 B2 * | 12/2022 | McCumber | G01G 19/4142 |
| 11,518,528 B2 * | 12/2022 | McCumber | B64C 19/00 |
| 11,560,232 B2 * | 1/2023 | Holstine | B64D 25/10 |
| 11,565,791 B2 * | 1/2023 | Fulcher | B64D 25/10 |
| 2008/0156602 A1 | 7/2008 | Hiemenz | |
| 2011/0035118 A1 | 2/2011 | Hiemenz | |
| 2015/0217780 A1 | 8/2015 | Chen et al. | |
| 2017/0106981 A1 | 4/2017 | Bolukbasi | |
| 2018/0162539 A1 | 6/2018 | Azizi Pourzadeh | |
| 2019/0266472 A1 | 8/2019 | Johnson | |
| 2020/0096072 A1 | 3/2020 | Kawecki | |
| 2020/0151475 A1 | 5/2020 | Wunsche et al. | |
| 2020/0189756 A1 | 6/2020 | Salois et al. | |

FOREIGN PATENT DOCUMENTS

| | | |
|---|---|---|
| EP | 3798120 | 3/2021 |
| GB | 959900 | 6/1964 |
| RU | 2671896 | 11/2018 |
| WO | 2013120142 | 8/2013 |

OTHER PUBLICATIONS

European Patent Office; European Search Report dated Feb. 11, 2022 in Application No. 21199831.5.
European Patent Office; European Search Report dated Feb. 23, 2022 in Application No. 21198332.5.
European Patent Office; European Search Report dated Feb. 11, 2022 in Application No. 21199112.0.
USPTO; Pre-Interview OA dated in Mar. 24, 2022 in U.S. Appl. No. 17/036,336.
USPTO; Pre-Interview OA dated in Mar. 25, 2022 in U.S. Appl. No. 17/036,391.
European Patent Office; European Office Action dated Dec. 15, 2022 in Application No. 21199831.5.
USPTO; Pre-Interview Office Action dated Jul. 12, 2022 in U.S. Appl. No. 17/036,229.
USPTO; Notice of Allowance dated Aug. 11, 2022 in U.S. Appl. No. 17/036,229.
USPTO; Notice of Allowance dated Aug. 3, 2022 in U.S. Appl. No. 17/036,336.
USPTO; Notice of Allowance dated Aug. 11, 2022 in U.S. Appl. No. 17/036,391.
USPTO; Notice of Allowance dated Aug. 31, 2022 in U.S. Appl. No. 17/036,336.
USPTO; Notice of Allowance dated Aug. 31, 2022 in U.S. Appl. No. 17/036,391.
USPTO; Notice of Allowance dated Sep. 1, 2022 in U.S. Appl. No. 17/036,229.
European Patent Office; European Office Action dated Jul. 27, 2023 in Application No. 21199112.0.
European Patent Office; European Official Action dated Aug. 17, 2023 in Application No. 21198208.7.

* cited by examiner

AUTOMATIC EJECTION SEAT PERFORMANCE AND ACCOMODATION OPTIMIZATION BASED ON ACTIVE INPUT OF AIRCREW DATA

FIELD

The present disclosure relates to ejection systems for aircraft and, more particularly, to automatic consistent optimization of such ejection systems based on actively received inputs.

BACKGROUND

Certain aircraft may include ejection systems designed to eject a member of the flight crew from the aircraft in certain situations. These ejection systems typically include an ejection seat in which the member of the flight crew is located during flight. The ejection seat may have various adjustable settings which are desirable to adjust based on parameters and preferences of the ejection seat and/or flight crew member. For example, the ejection seat may have settings related to timing of ejection, deployment of parachutes, adjustments to dimensions (e.g., lumbar support, seat height, headrest position), or the like. Currently, these settings are manually input during a pre-flight check. However, this is a time-consuming process as each setting is adjusted manually and separate from many other settings.

SUMMARY

Disclosed herein is a system for automatic adjustment of an ejection system for an aircraft. The system includes the ejection system having a plurality of adjustable settings. The system further includes an input device configured to receive user input. The system further includes a controller coupled to the ejection system and to the input device and configured to adjust at least one of the plurality of the adjustable settings of the ejection system based on the user input.

In any of the foregoing embodiments, the controller is further configured to: determine an identifier of a user of the system based on the user input; retrieve specific settings of the user by accessing a database based on the identifier; and adjust the at least one of the adjustable settings based on the specific settings of the user retrieved from the database.

In any of the foregoing embodiments, the input device includes a microphone configured to detect audio data corresponding to a voice of the user and the controller is configured to determine the identifier of the user by using a voice recognition algorithm on the audio data.

In any of the foregoing embodiments, the input device includes an image sensor configured to detect a fingerprint scan of the user and the controller is configured to determine the identifier of the user by analyzing the fingerprint scan.

In any of the foregoing embodiments, the input device includes an electronic port configured to be electrically coupled to a portable electronic device, the user input includes specific settings of a user of the ejection system that are transferred from the portable electronic device to the electronic port, and the controller is configured to adjust the at least one of the adjustable settings based on the specific settings of the user.

In any of the foregoing embodiments, the electronic port is configured to be physically coupled to and communicate with a portable storage device, and the portable electronic device is the portable storage device.

In any of the foregoing embodiments, the electronic port is configured to communicate with a portable computing device, and the portable electronic device is the portable computing device.

In any of the foregoing embodiments, the electronic port is configured to communicate with the portable computing device via at least one of a physical connection between the electronic port and the portable computing device or via a wireless connection between the electronic port and the portable computing device.

Any of the foregoing embodiments may further include the portable computing device having: a network access device configured to communicate with the electronic port; a processor coupled to the network access device and configured to run a mobile application; and a mobile device input device coupled to the processor, wherein the portable computing device is further configured to transmit the specific settings of the user in response to the mobile device input device receiving a specific user input while the processor is running the mobile application.

In any of the foregoing embodiments, at least one of: the ejection system includes a seat electronic sequencer and the plurality of the adjustable settings include at least one of a parachute deployment timing, a drogue deployment timing, or a thrust angle alignment; the ejection system includes a seat electronic position controller and the plurality of the adjustable settings include at least one of a seat height, a lumbar support, a headrest position, a rail angle, or an actuator position; or the ejection system includes an interseat electronic sequencer and the plurality of the adjustable settings include an interseat timing.

Also disclosed is a system for automatic adjustment of an ejection system for an aircraft. The system includes the ejection system having a plurality of adjustable settings. The system further includes an input device configured to receive user input. The system further includes a controller coupled to the ejection system and to the input device and configured to: receive or access specific settings of a user of the ejection system based on the user input, and adjust at least one of the plurality of the adjustable settings of the ejection system based on the specific settings of the user.

Also disclosed is a method for automatic adjustment of an ejection system for an aircraft. The method includes receiving, by an input device, user input. The method further includes adjusting, by a controller, at least one of a plurality of adjustable settings of the ejection system based on the user input.

Any of the foregoing embodiments may further include determining, by the controller, an identifier of a user of the ejection system based on the user input; retrieving, by the controller, specific settings of the user by accessing a database based on the identifier; and adjusting, by the controller, the at least one of the adjustable settings based on the specific settings of the user retrieved from the database.

In any of the foregoing embodiments, receiving the user input includes receiving audio data corresponding to a voice of the user, and wherein determining the identifier of the user includes performing a voice recognition algorithm on the audio data.

In any of the foregoing embodiments, receiving the user input includes detecting, by a camera, a fingerprint scan of the user, and wherein determining the identifier of the user includes analyzing the fingerprint scan.

In any of the foregoing embodiments, receiving the user input includes receiving the user input electronically from a portable electronic device via an electronic port; the user input includes specific settings of a user of the ejection system that are transferred from the portable electronic device to the electronic port; and adjusting the at least one of the adjustable settings includes adjusting the at least one of the adjustable settings based on the specific settings received from the portable electronic device.

In any of the foregoing embodiments, receiving the user input electronically from the portable electronic device includes receiving the user input via a physical coupling between the portable electronic device and the electronic port.

In any of the foregoing embodiments, receiving the user input electronically from the portable electronic device includes receiving the user input from a portable computing device.

In any of the foregoing embodiments, receiving the user input electronically from the portable electronic device includes receiving the user input at least one of via a physical connection between the electronic port and the portable computing device or via a wireless connection between the electronic port and the portable computing device.

Any of the foregoing embodiments may further include running, by a processor of the portable computing device, a mobile application; receiving, by a mobile device input device of the portable computing device, a specific user input; and transmitting, by the portable computing device, the specific settings of the user to the electronic port in response to the mobile device input device receiving the specific user input while the processor is running the mobile application.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
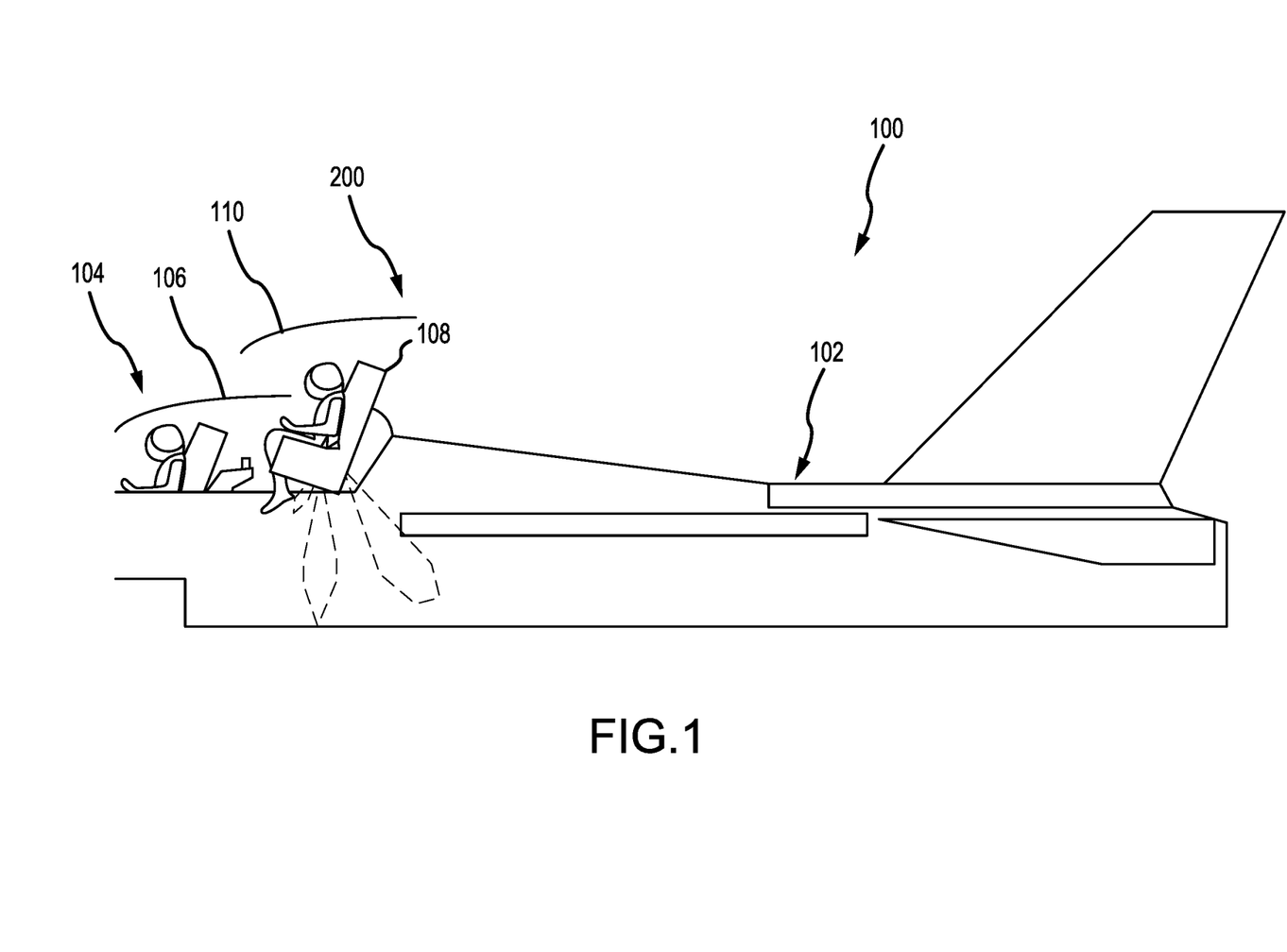
FIG. 1 illustrates an aircraft having two cockpits with respective ejection systems and a system for adjusting settings of the ejection systems, in accordance with various embodiments.

Referring now to FIG. 1, an aircraft 100 may include a fuselage 102. The fuselage 102 may define or include a cockpit 104 in which one or more member of a flight crew may be located. The fuselage 102 may further define or include a second cockpit 108 in which one or more member of a flight crew may be located. In various embodiments, the cockpit 104 may include one or more ejection systems to facilitate ejection of one or more member of the flight crew. In that regard, the first cockpit 104 may include a hatch or canopy 106 that separates from or moves relative to the first cockpit 104 to allow the member or members of the flight crew in the first cockpit 104 to eject from the fuselage 102. The second cockpit 108 may further include a hatch or canopy 110 that separates from or moves relative to the second cockpit 108 to allow the member or members of the flight crew in the second cockpit 108 to eject from the fuselage 102. The aircraft 100 may be a passenger aircraft, a cargo aircraft, a military aircraft, or the like.

Figure 2A:
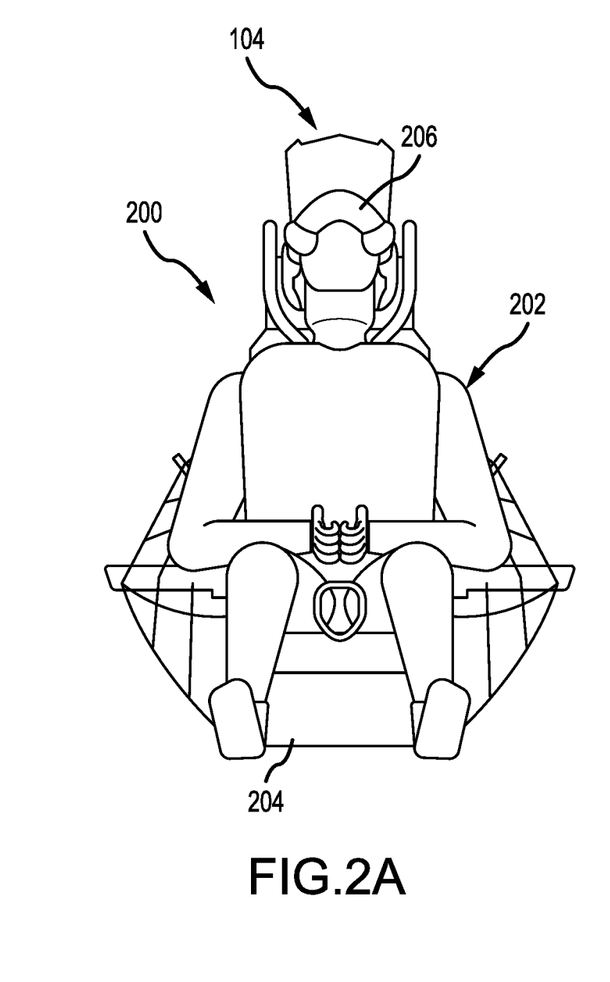
FIGS. 2A and 2B illustrate a front view and a side view, respectively, of various features of an ejection system including an ejection seat, in accordance with various embodiments.
Figure 2B:
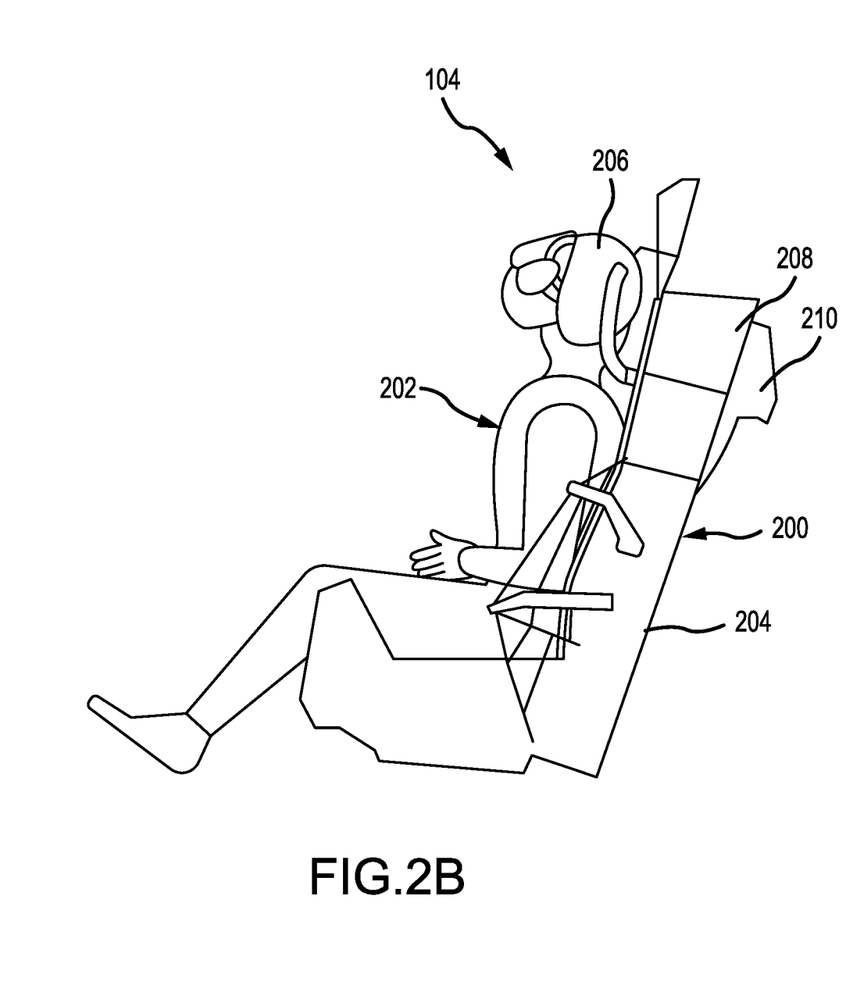

Referring now to FIGS. 2A and 2B, an exemplary ejection system 200 may be included in the cockpit 104. In particular, the ejection system 200 may include a seat 204 on which a user 202 may sit or otherwise rest and a helmet 206 which may be supported on a head of the user 202. The seat 204 may include various components of the ejection system 200 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

Referring now to FIGS. 2A, 2B, 3A, and 3B, a system 300 may automatically adjust features of the ejection system 200 based on received user input. The system 300 may include a controller 302. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

Figure 3A:
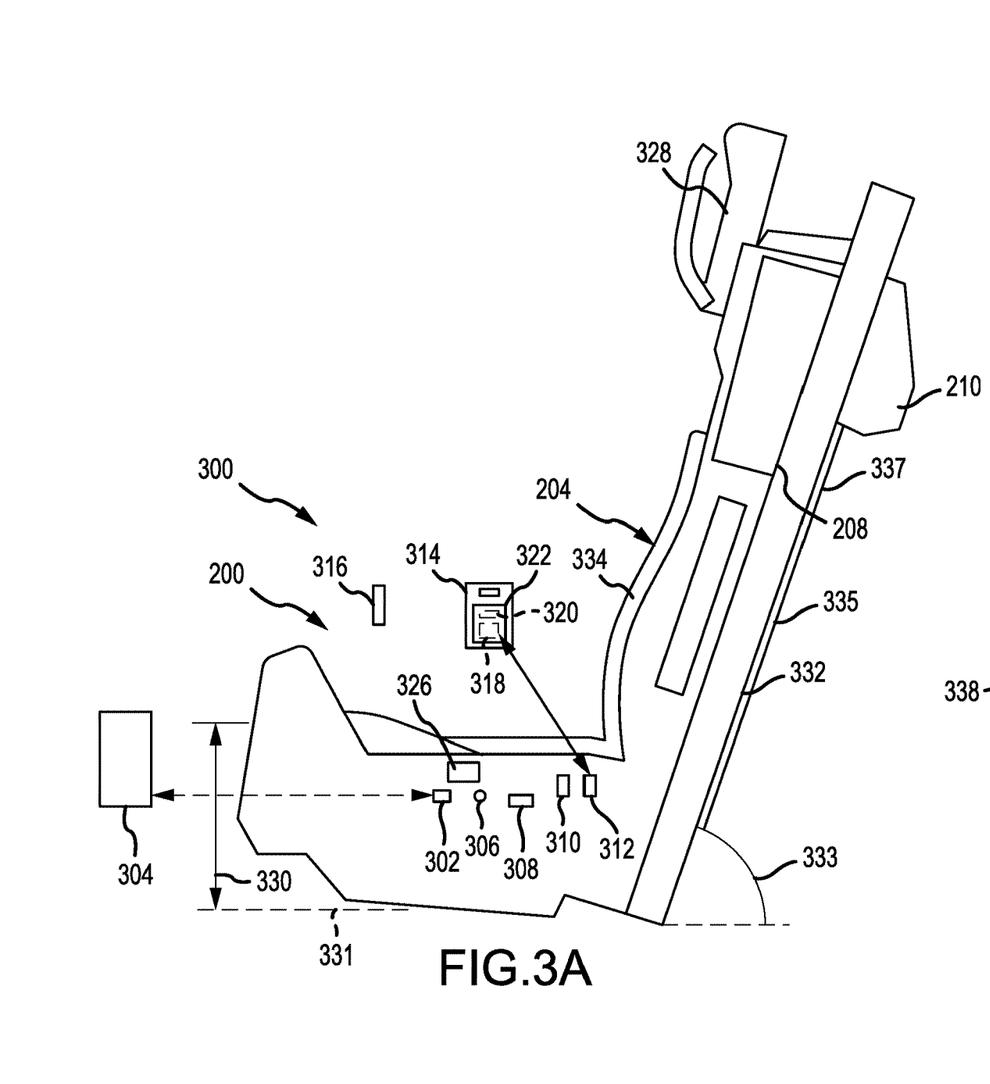
FIGS. 3A and 3B are side and back views, respectively, of the ejection seat of FIGS. 2A and 2B, in accordance with various embodiments.
Figure 3B:
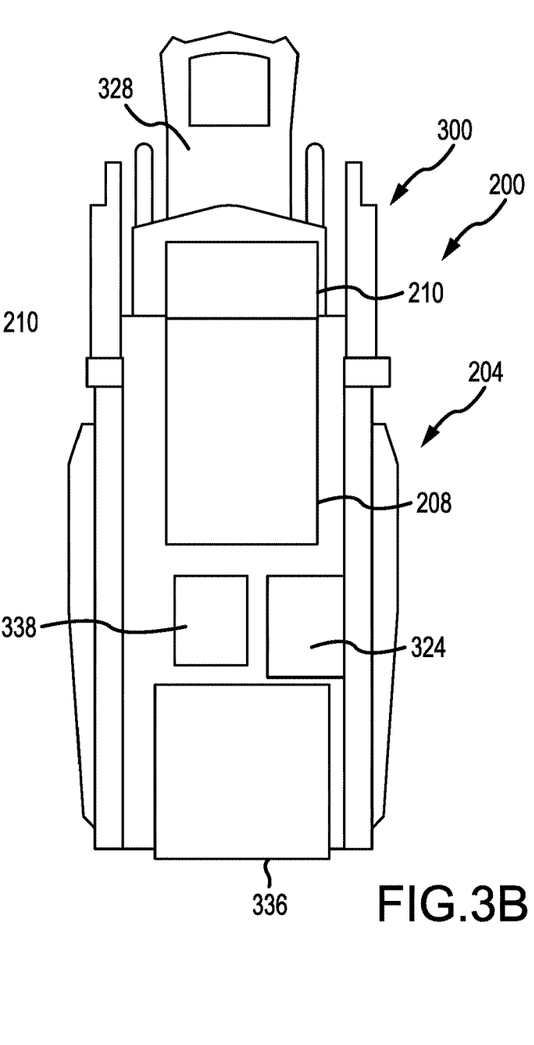

The system 300 may further include a database or remote memory 304. The database 304 may be located on a same aircraft as the system 300 or may be located remote from the system 300. The controller 302 may communicate with the database 304 via any wired or wireless protocol. In that regard, the controller 302 may access data stored in the database 304. The database 304 may store identifiers associated with users of the system 300 and may store specific settings for various components of the ejection system 200 that are associated with each of the user identifiers. For example, a first user identifier may be associated with a first set of settings for the ejection system 200 and a second user identifier may be associated with a second set of settings for the ejection system 200. The controller 302 may access the specific settings for each user identifier by comparing the user identifier to the database 304.

The system 300 may further include one or more input device. For example, the input device may include any one or more of a microphone 306, an image sensor 308, a wired electronic port 310, or a wireless electronic port 312. Each of the input devices may communicate with the controller 302.

The microphone 306 may include any microphone or other sensor capable of detecting audio data corresponding to a voice of a user. In that regard, the microphone 306 may detect the audio data and the controller 302 may perform a voice recognition algorithm on the audio data to determine a source of the specific user. The voice recognition algorithm may determine a specific identifier of the user who spoke the detected audio data. In that regard, the user may be instructed, either by the system 300 (e.g., via a speaker or display) or in another manner, to speak a specific word or phrase (e.g., "this is my voice for recognition"). The user may speak the specific word or phrase and the voice recognition algorithm may determine the specific identifier of the user based on the spoken word or phrase. The controller 302 may retrieve the specific settings associated with the specific identifier of the user from the database 304 using the determined specific identifier of the user. As will be discussed further below, the controller 302 may adjust adjustable settings of the ejection system 200 to have the specific settings associated with the user identifier.

The image sensor 308 may include a camera, light detector, infrared detector, or any other image sensor capable of detecting image data corresponding to any wavelength of light. The image sensor may be designed to detect image data corresponding to a biometric feature of the user. For example, the image sensor 308 may be configured as a fingerprint scanner and may capture image data corresponding to a fingerprint of the user. As another example, the image sensor may be configured to detect a retina scan of the user. The controller 302 may receive the detected fingerprint scan or retina scan of the user and may determine a specific identifier of the user based on the detected fingerprint scan or retina scan. As with the user identifier determined based on the audio data, the controller 302 may adjust adjustable settings of the ejection system 200 to have the specific settings associated with the user identifier.

The wired electronic port 310 may be designed to communicate with a portable electronic device 316 via a wired or direct connection therebetween. The portable electronic device 316 may include any electronic device having a port designed to communicate with the wired electronic port 310 via a direct connection (e.g., via direct contact between conductors). For example, the portable electronic device 316 may include a common access card (CAC), a secure digital (SD) card, a memory card, a universal serial bus (USB) memory stick, a portable computing device having a wired port (e.g., an Ethernet port), or the like. For example, the portable electronic device 316 may communicate with the wired electronic port 310 via any protocol such as a controller area network (CAN) bus protocol, an Ethernet physical layer protocol (e.g., those using 10 BASE-T, 100 BASE-T, 1000 BASE-T, etc), an IEEE 1394 interface (e.g., FireWire), Integrated Services for Digital Network (ISDN), a digital subscriber line (DSL), or any other protocol capable of transmissions via contact between conductors.

The wired electronic port 310 may request or automatically be provided with information from the portable electronic device 316. For example, the wired electronic port 310 may access data from the portable electronic device 316 in response to connection between the wired electronic port 310 and the portable electronic device 316. In that regard, the data transmitted from the portable electronic device 316 to the wired electronic port 310 may be referred to as "user input." In various embodiments, the portable electronic device 316 may be the helmet 206 such that the data is transmitted to the wired electronic port 310 in response to the helmet 206 being connected to the ejection system 200.

In various embodiments, the user may manipulate an input device of the portable electronic device 316 to cause the portable electronic device 316 to transmit specific data to the wired electronic port. In various embodiments, the portable electronic device 316 may store a specific identifier of the user and may provide the identifier to the wired electronic port 310. In that regard, the controller 302 may retrieve the specific settings associated with the user identifier using the identifier. In various embodiments, the portable electronic device 316 may store the specific settings of the user and may provide the specific settings to the wired electronic port. In that regard, the controller 302 may adjust the adjustable settings of the ejection system 200 to have the specific settings provided by the portable electronic device 316.

The wireless electronic port 312 may be designed to communicate with a portable electronic device 314 via a wireless protocol. For example, the portable electronic device 314 may include a key fob, a portable computing device having a wireless communication port (e.g., a mobile telephone, a laptop, or a tablet), or the like. For example, the wireless electronic port 312 and the portable electronic device 314 may communicate via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, or any other protocol capable of wireless transmissions.

The wireless electronic port 312 may request information from the portable electronic device 316. For example, the portable electronic device 316 may transmit data to the wireless electronic port 312 in response to a connection therebetween. In that regard, the information provided by the portable electronic device 316 may be referred to as "user input." In various embodiments, the portable electronic device 316 may be a portable computing device and may include a network access device 318, a processor 320, and a mobile device input device 322. The processor 320 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the processor 320 may further include any non-transitory memory known in the art. The memory may store instructions usable by the logic device to perform operations. The network access device 318 may include any network access device capable of communicating with the wireless electronic port 312 via a wireless protocol as discussed above. The mobile device input device 322 may include any input device capable of receiving user input such as a button, a keypad, a dial, a touchscreen, a microphone, or the like.

In various embodiments, the processor 320 may be designed to run a mobile application software. The mobile application software may be associated with the system 300. In that regard, the user may provide an input to the portable electronic device 314 using the mobile device input device 322. In response to the mobile device input device 322 receiving the user input, the processor 320 may control the network access device 318 to transmit data to the wireless electronic port 312. For example, the transmitted data may include a specific user identifier, specific settings of the ejection system 200 that are associated with the user, or the like. In response to receiving a specific user identifier, the controller 302 may access specific user settings from the database 304. The controller 302 may adjust the adjustable settings of the ejection system based on the retrieved or received specific settings of the user.

The controller 302 may directly control the various settings of the ejection system 200 or may provide instructions to components of the ejection system 200 and those components may adjust the settings. For example, the ejection system 200 may include a seat electronic sequencer 324, a seat electronic position controller 326, an interseat electronic sequencer 338, and the like. Each of the seat electronic sequencer 324, the seat electronic position controller 326, and the interseat electronic sequencer 338 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, these elements may further include any non-transitory memory known in the art. The seat electronic sequencer 324, the seat electronic position controller 326, and the interseat electronic sequencer 338 may be coupled to the controller 302 and may receive the specific settings from the controller 302 or may receive instructions regarding adjustments of components of the ejection system 200 from the controller 302.

The seat electronic sequencer 324 may make adjustments to components of the ejection system 200 that alter a sequence or timing of ejection events such as settings associated with the drogue 210, the main parachute 208, and a thrust angle of the seat 204 during ejection. For example, the seat electronic sequencer 324 may set a parachute deployment timing corresponding to a delay between ejection and deployment of the main parachute 208. The seat electronic sequencer 324 may further set a drogue deployment timing corresponding to a delay between ejection and deployment of the drogue 210. The seat electronic sequencer 324 may further adjust the angle of the seat 204 relative to the fuselage 102 of FIG. 1 during ejection of the seat 204 from the cockpit 104.

The seat electronic position controller 326 may make adjustments to components of the ejection system 200 that affect a position of a user within the system 200 such as positions of various elements of the seat 204. For example, the seat electronic position controller 326 may adjust a position of a headrest 328 (e.g., in any two or more directions corresponding to a front of an aircraft, a rear of an aircraft, closer to a floor surface 331, farther from the floor surface 331, towards a starboard side, and towards a port side). The seat electronic position controller 326 may further control a seat height actuator 336 to adjust a seat height 330 of the seat 204 (e.g., to increase or decrease the seat height 330). The seat electronic position controller 326 may further adjust a rail angle 333 corresponding to an angle between seat rails 332 and the floor surface 331. The seat electronic position controller 326 may further adjust a lumbar support 334 to extend closer to or farther from a surface 335 of a backrest 337.

The interseat electronic sequencer 338 may make adjustments to components of the ejection system 200 that affect an interseat timing between components. For example, the interseat electronic sequencer 338 may adjust a timing or delay between ejection of the seat 204 and separation of at least one of a hatch or canopy (e.g., the hatch or canopy 106, 110 of FIG. 1) from the respective fuselage, or adjust a delay between ejection of two or more cockpits (e.g., between the first cockpit 104 and the second cockpit 108 of FIG. 1). For example, it may be desirable for a different timing to be used for a heavier user relative to a lighter user. The interseat electronic sequencer 338 may select an order of ejection between two or more cockpits based on the specific settings of two or more users. As another example, it may be desirable for a different timing to be used for a heavier user relative to a lighter user. In that regard, the interseat electronic sequencer 338 may select a timing for a user to eject relative to separation of a hatch or canopy from a fuselage based on the specific settings of the user.

As alluded to above, the various adjustable settings of the ejection system 200 may vary based on at least one of physical characteristics of a user or user preferences. In that regard, the specific settings of the user stored in the database 304 or retrieved from the portable electronic device 314 or 316 may include at least one of physical characteristics of the user or user preferences. The controller 302 or one or more of the seat electronic sequencer 324, the seat electronic position controller 326, or the interseat electronic sequencer 338 may select values for the various adjustable settings based on the one or more of the physical characteristics of the user or the user preferences. For example, the physical characteristics may include at least one of a weight of the user, a gender of the user, a sitting height of the user (e.g., a length of at least one of a torso or a head of the user), a location of a center of gravity of the user relative to other parts of the body of the user, a reach of the user (e.g., corresponding to at least one of an arm length or a leg length of the user), or the like. In various embodiments, the specific settings of the user stored in the database 304 or retrieved from the portable electronic device 314 or 316 may include specific values of the adjustable settings instead of, or in addition to, the physical characteristics or the user preferences.

Figure 4:
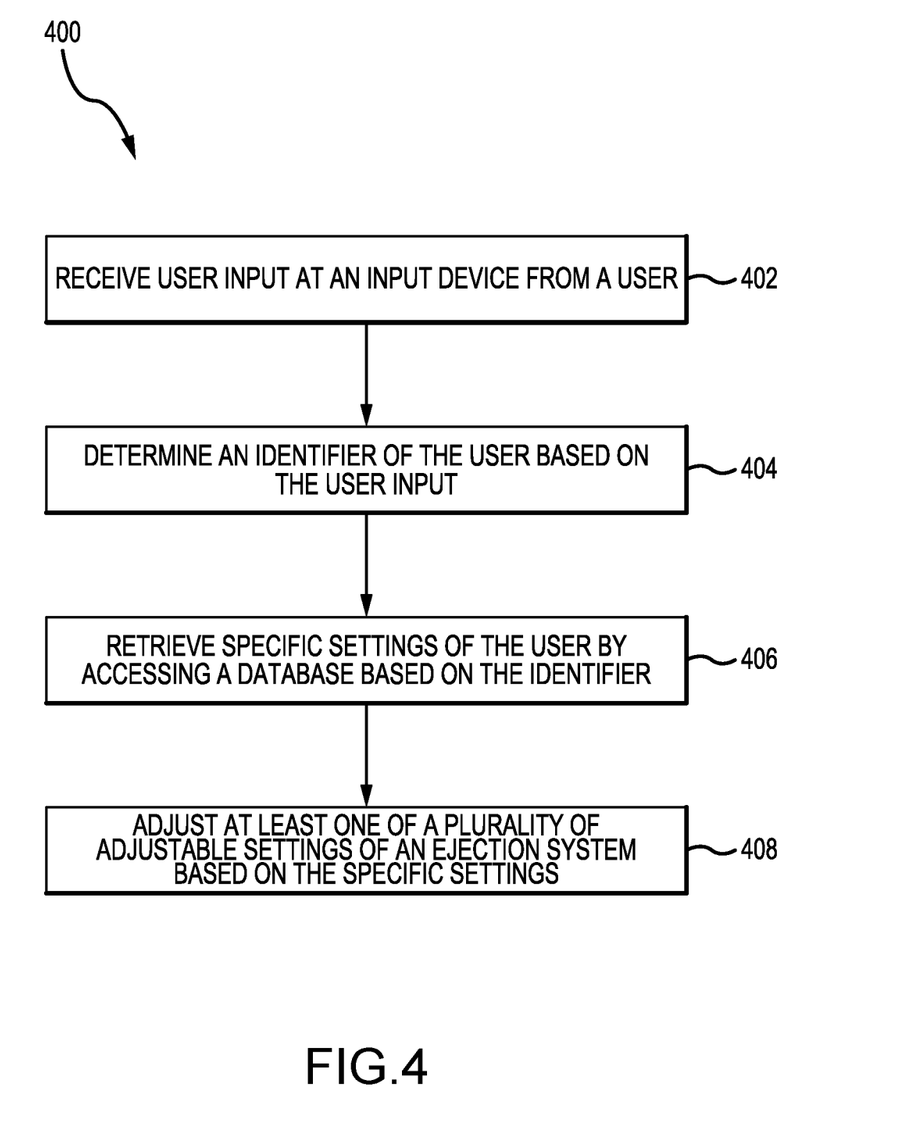
FIG. 4 is a flowchart illustrating a method for automatic adjustment of various settings of an ejection system, in accordance with various embodiments.

Referring now to FIG. 4, a flowchart illustrates a method 400 for automatic adjustment of an ejection system. The method 400 may be performed by components of a system similar to the system 300 of FIGS. 3A and 3B. The method 400 may begin in block 402 where an input device of the system may receive user input. The user input may include biometric data (e.g., a fingerprint or retina scan), audio data corresponding to voice of the user, or the like.

In block 404, a controller of the system may determine an identifier of the user based on the user input. For example, the controller may compare the biometric data to stored biometric data, or may analyze the biometric data, to determine a user identifier associated with the user.

In block 406, the controller may retrieve specific settings of the user corresponding to settings of an ejection system from a database using the user identifier. For example, the controller may access the database and compare the user identifier to user identifiers stored in the database, and may retrieve the specific settings associated with the user identifier.

In block 408, the controller may adjust at least one of a plurality of adjustable settings (e.g., those described above with reference to the seat electronic sequencer, the seat electronic position controller, and the interseat electronic sequencer) based on the specific settings retrieved from the database.

Figure 5:
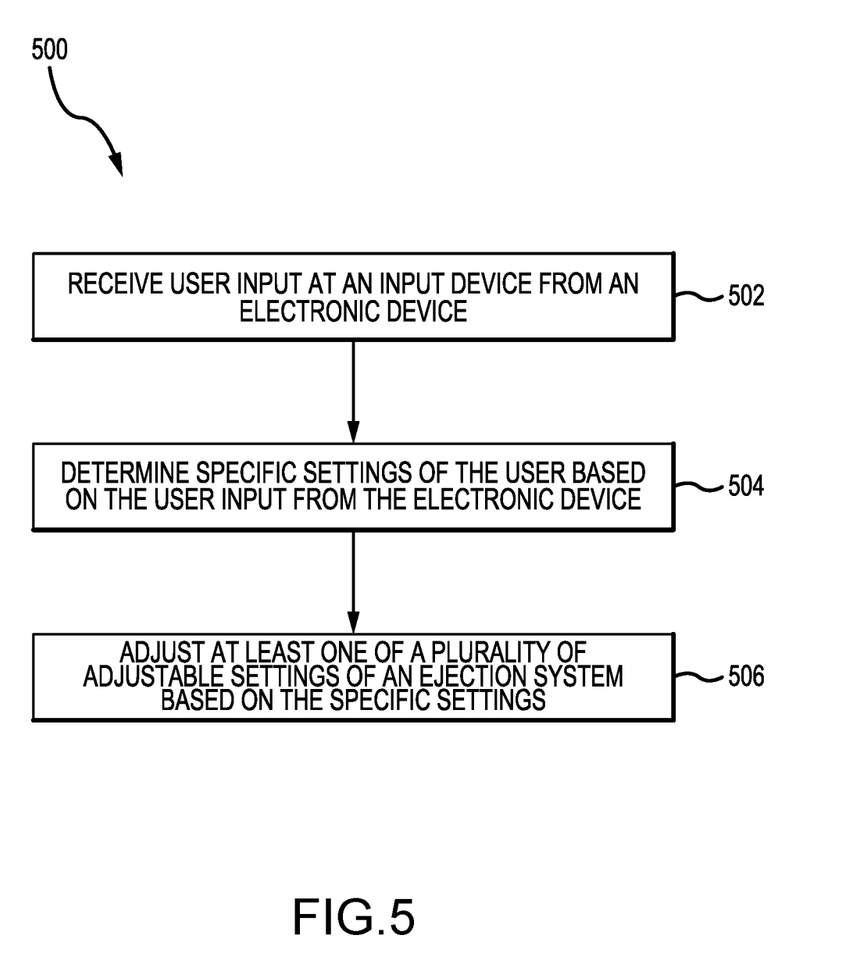
FIG. 5 is a flowchart illustrating a method for automatic adjustment of various settings of an ejection system, in accordance with various embodiments.

Referring now to FIG. 5, a flowchart illustrates a method 500 for automatic adjustment of an ejection system. The method 500 may be performed by components of a system similar to the system 300 of FIGS. 3A and 3B. The method 500 may begin in block 502 where an input device of the system may receive user input from a portable electronic device via a wired or wireless electronic port.

In block 504, a controller of the system may determine specific settings of the user corresponding to settings of an ejection system based on the user input from the portable electronic device. For example, the data received from the portable electronic device may include the specific settings. As another example, the received data may include a user identifier and the controller may retrieve the specific settings from a database based on the user identifier.

In block 506, the controller may adjust at least one of a plurality of adjustable settings (e.g., those described above with reference to the seat electronic sequencer, the seat electronic position controller, and the interseat electronic sequencer) based on the specific settings received from the portable electronic device or retrieved from the database.

Figure 6:
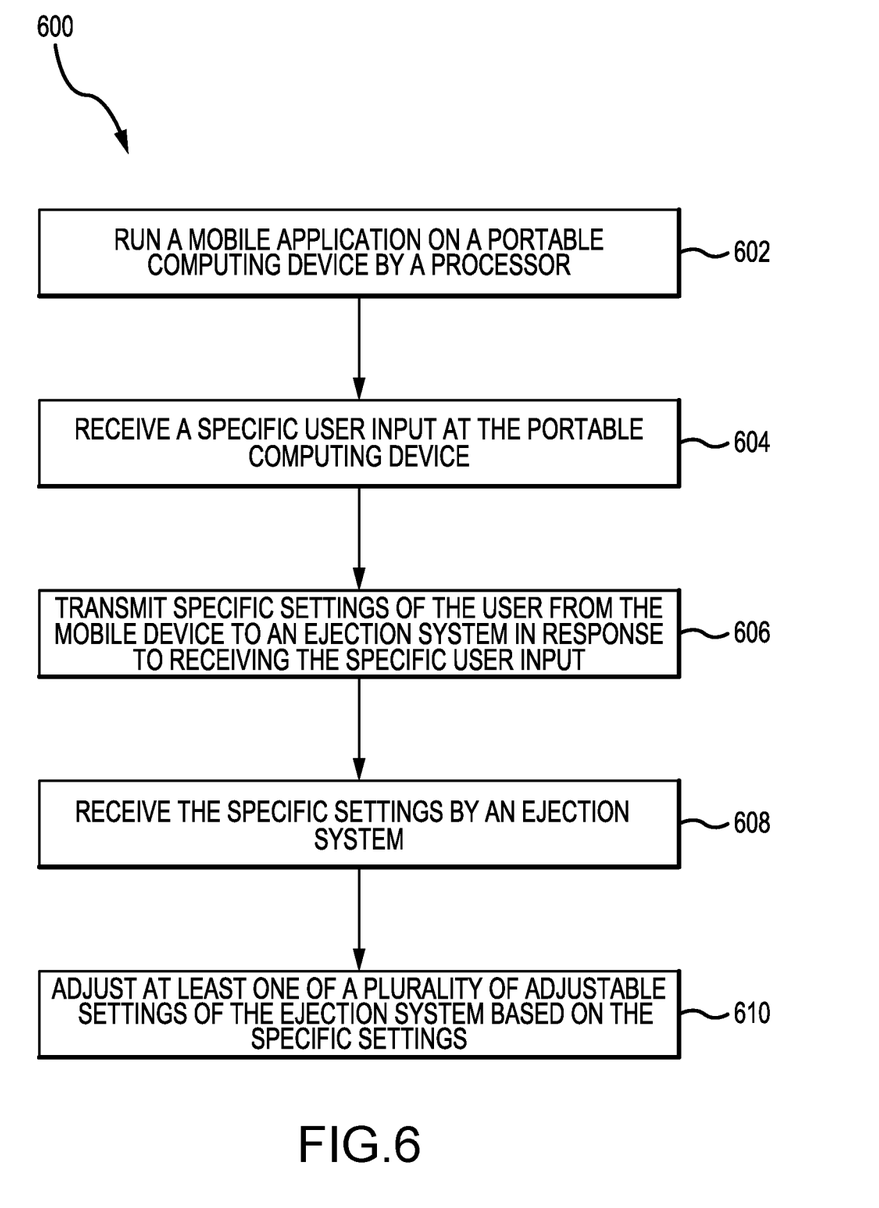
FIG. 6 is a flowchart illustrating a method for automatic adjustment of various settings of an ejection system, in accordance with various embodiments.

Turning now to FIG. 6, a flowchart illustrates a method 600 for automatic adjustment of an ejection system. The method 600 may be performed by components of a system similar to the system 300 of FIGS. 3A and 3B. The method 600 may begin in block 602 where a mobile application is run on a portable computing device by a processor. The mobile application may be associated with the ejection system.

In block 604, an input device of the portable computing device may receive a specific user input. For example, the user may select a button on the mobile application that says "upload settings to ejection system." As another example, the user input may include the user starting the mobile application.

In block 606, the mobile application may transmit specific settings of the user corresponding to the ejection system to the ejection system in response to receiving the user input at the portable computing device. This data may be transmitted to the system via a network access device of the portable computing device and a port (i.e., an input device) of the system.

In block 608, a controller of the system may receive the specific settings of the user from the portable computing device.

In block 610, the controller may adjust at least one of a plurality of adjustable settings (e.g., those described above with reference to the seat electronic sequencer, the seat electronic position controller, and the interseat electronic sequencer) based on the specific settings received from the portable computing device.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for automatic adjustment of an ejection system for an aircraft, the system comprising:
   the ejection system having a plurality of adjustable settings;
   an input device configured to receive user input; and
   a controller coupled to the ejection system and to the input device and configured to:
   determine an identifier of a user of the system based on the user input;
   retrieve specific settings of the user by accessing a database based on the identifier; and
   adjust at least one of the plurality of the adjustable settings of the ejection system based on the specific settings of the user retrieved from the database.

2. The system of claim 1 wherein the input device includes a microphone configured to detect audio data corresponding to a voice of the user and the controller is configured to determine the identifier of the user by using a voice recognition algorithm on the audio data.

3. The system of claim 1 wherein the input device includes an image sensor configured to detect a fingerprint scan of the user and the controller is configured to determine the identifier of the user by analyzing the fingerprint scan.

4. The system of claim 1 wherein the input device includes an electronic port configured to be electrically coupled to a portable electronic device, the user input includes specific settings of a user of the ejection system that are transferred from the portable electronic device to the electronic port, and the controller is configured to adjust the at least one of the adjustable settings based on the specific settings of the user.

5. The system of claim 4 wherein the electronic port is configured to be physically coupled to and communicate with a portable storage device, and the portable electronic device is the portable storage device.

6. The system of claim 4 wherein the electronic port is configured to communicate with a portable computing device, and the portable electronic device is the portable computing device.

7. The system of claim 6 wherein the electronic port is configured to communicate with the portable computing device via at least one of a physical connection between the electronic port and the portable computing device or via a wireless connection between the electronic port and the portable computing device.

8. The system of claim 7 further comprising the portable computing device having:
   a network access device configured to communicate with the electronic port;
   a processor coupled to the network access device and configured to run a mobile application; and
   a mobile device input device coupled to the processor,
   wherein the portable computing device is further configured to transmit the specific settings of the user in response to the mobile device input device receiving a specific user input while the processor is running the mobile application.

9. The system of claim 1 wherein at least one of:
   the ejection system includes a seat electronic sequencer and the plurality of the adjustable settings include at least one of a parachute deployment timing, a drogue deployment timing, or a thrust angle alignment;
   the ejection system includes a seat electronic position controller and the plurality of the adjustable settings include at least one of a seat height, a lumbar support, a headrest position, a rail angle, or an actuator position; or
   the ejection system includes an interseat electronic sequencer and the plurality of the adjustable settings include an interseat timing.

10. A method for automatic adjustment of an ejection system for an aircraft, the method comprising:
    receiving, by an input device, user input; and
    determining, by the controller, an identifier of a user of the ejection system based on the user input;
    retrieving, by the controller, specific settings of the user by accessing a database based on the identifier; and
    adjusting, by a controller, at least one of a plurality of adjustable settings of the ejection system based on the user input specific settings of the user retrieved from the database.

11. The method of claim 10 wherein receiving the user input includes receiving audio data corresponding to a voice of the user, and wherein determining the identifier of the user includes performing a voice recognition algorithm on the audio data.

12. The method of claim 10 wherein receiving the user input includes detecting, by a camera, a fingerprint scan of the user, and wherein determining the identifier of the user includes analyzing the fingerprint scan.

13. The method of claim 10 wherein:
    receiving the user input includes receiving the user input electronically from a portable electronic device via an electronic port;
    the user input includes specific settings of a user of the ejection system that are transferred from the portable electronic device to the electronic port; and
    adjusting the at least one of the adjustable settings includes adjusting the at least one of the adjustable settings based on the specific settings received from the portable electronic device.

14. The method of claim 13 wherein receiving the user input electronically from the portable electronic device includes receiving the user input via a physical coupling between the portable electronic device and the electronic port.

15. The method of claim 13 wherein receiving the user input electronically from the portable electronic device includes receiving the user input from a portable computing device.

16. The method of claim 15 wherein receiving the user input electronically from the portable electronic device includes receiving the user input at least one of via a physical connection between the electronic port and the portable computing device or via a wireless connection between the electronic port and the portable computing device.

17. The method of claim 16 further comprising:
    running, by a processor of the portable computing device, a mobile application;
    receiving, by a mobile device input device of the portable computing device, a specific user input; and
    transmitting, by the portable computing device, the specific settings of the user to the electronic port in response to the mobile device input device receiving the specific user input while the processor is running the mobile application.

* * * * *

UNITED STATES PATENT AND TRADEMARK OFFICE
CERTIFICATE OF CORRECTION

| | |
|---|---|
| PATENT NO. | : 11,891,183 B2 |
| APPLICATION NO. | : 17/036301 |
| DATED | : February 6, 2024 |
| INVENTOR(S) | : Ronald John McCumber |

It is certified that error appears in the above-identified patent and that said Letters Patent is hereby corrected as shown below:

In the Claims

Claim 10, at Column 12, Line 16 please delete the phrase "user input"

Signed and Sealed this
Fourth Day of June, 2024

Katherine Kelly Vidal
*Director of the United States Patent and Trademark Office*